United States Patent
Fischer et al.

(10) Patent No.: US 6,198,849 B1
(45) Date of Patent: Mar. 6, 2001

(54) PROCESS FOR PRODUCING AND EVALUATING A VIDEO DATA STREAM FOR VIDEO TRANSMISSION

(75) Inventors: Ralf Fischer, Diekholzen; Gunnar Nitsche, Hildesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/983,219

(22) PCT Filed: Apr. 20, 1996

(86) PCT No.: PCT/DE96/00690

§ 371 Date: Dec. 19, 1997

§ 102(e) Date: Dec. 19, 1997

(87) PCT Pub. No.: WO97/01247

PCT Pub. Date: Jan. 9, 1997

(30) Foreign Application Priority Data

Jun. 20, 1995 (DE) .............................. 195 21 992

(51) Int. Cl.[7] ..................... G06K 9/36

(52) U.S. Cl. .............. 382/232; 382/236; 382/250; 358/433; 348/404.1; 348/415.1; 375/240.15

(58) Field of Search .................... 382/232, 250; 358/432, 433; 348/416, 403, 404, 405, 390, 400.1–407.1, 415.1, 416.1, 699, 715; 375/240, 240.12–240.16, 240.24, 240.27

(56) References Cited

U.S. PATENT DOCUMENTS

| | | | |
|---|---|---|---|
| 5,317,396 | * 5/1994 | Fujinami | 348/390 |
| 5,591,956 | * 1/1997 | Longacre, Jr. et al. | 235/462.1 |
| 5,598,216 | * 1/1997 | Lee | 348/416 |
| 5,771,102 | * 6/1998 | Vogt et al. | 358/433 |
| 5,905,815 | * 5/1999 | Mack et al. | 382/250 |
| 5,917,948 | * 6/1999 | Holtz | 382/232 |

FOREIGN PATENT DOCUMENTS 0 546 339 A1    6/1993   (EP) .
WO 96/12993    5/1996   (WO) .

OTHER PUBLICATIONS

PCT Written Opinion issued in PCT application PCT/US97/17983 dated Jul. 20, 1998.

Contact Person: Karel Rijkse, "Line Transmission Of Non–Telephone Signals—Video Coding For Low Bitrate Communication," Draft ITU–T Recommendation H.263 (May 2, 1996), International Telecommunication Union.

Schäfer, R. et al., Bildverarbeitung und Bildkompression für die digitale HDTV–Magnethandaufzeichnung und für den digitalen TV/HDTV Rundfunk, pp. 69–87.

* cited by examiner

*Primary Examiner*—Leo H. Boudreau
*Assistant Examiner*—Gregory Desire
(74) *Attorney, Agent, or Firm*—Kenyon & Kenyon (57) ABSTRACT

A method for generating a stream of image data which is to be transmitted via a data channel, in particular a mobile radio channel. In this method, the images are divided into a quantity of macroblocks. In addition, the image information elements are divided into classes of information elements of the same kind. The image data of at least a portion of the classes are inserted into the stream by macroblocks. In a deviation from the proposed H.263 standard, the image data in each macroblock which have a fixed word length, in particular the DQUANT and INTRADC values, are combined into a class (ADMIN+DC-INTRA) provided for them, and are inserted consecutively into the stream with no variable-length image data being transmitted between them. A method for analyzing a stream of data is also provided.

In this, a first quantity of coded macroblocks is decoded from the end with the bits of the image data transmitted first, and a second quantity of coded macroblocks is decoded from the end with the bits of the class transmitted last.

9 Claims, 8 Drawing Sheets

PROCESS FOR PRODUCING AND EVALUATING A VIDEO DATA STREAM FOR VIDEO TRANSMISSION

BACKGROUND INFORMATION

The method according to the invention proceeds from a method according to the species defined in the main claim. A video coding standard, provided for the conducted transmission of video images at a transmission rate of up to 64 kbit/sec, has already been proposed by the International Telecommunications Union. The standard is entitled "Draft Recommendation H.263" and comes from Study Group 15, Working Party 15/1, Document LBC-95, Apr. 7, 1995. This document contains essential information regarding source coding of the video signals, the syntax and semantics for data transmission, and decoding of the data in the receiver.

This standard, however, is not necessarily suitable for the transmission of video images over error-prone mobile radio networks, since the quality of the video images transmitted is insufficient because transmission errors occur. To solve this problem, the method according to the present invention provides various modifications to the conventional methods utilizing a conventional H.263 standard. Expressions which are known to those of ordinary skill in the art from this H.263 standard are referred to in the description below.

SUMMARY OF THE INVENTION

The method according to the present invention has the advantage that the quality of the video images transmitted, in particular when image data are transmitted via data channels in which multiple transmission errors may occur, is improved. Because those image data which have a fixed word width are combined into a particular class and are transmitted coherently and consecutively, not all of the subsequent information of the class being transmitted is lost after a transmission error occurs. The subsequent information words can be analyzed correctly without being influenced. This leads to an improvement in image quality after a transmission error occurs.

Because the coded image data of the macroblocks are inserted into the stream of image data in such a way that in the receiver station, one quantity of coded macroblocks is decodable forward while a second quantity of coded macroblocks is decoded backward, it is possible for a quantity of coded macroblocks to be decoded correctly even after a transmission error has occurred and has been recognized. This occurs because the macroblocks are divided into two groups, and that after transmission of the coded data of the macroblocks into the receiver station, a very wide binary word is present which consists of the data of both groups but is decoded from both ends. If an error occurs during decoding of the one group, only the remaining data of the same group of macroblocks should be discarded. The other group, i.e. the group of macroblocks which is being decoded from the other end, can still be decoded correctly. As a result after a transmission error has occurred, much fewer image regions fail to be updated from the previous video image than in the case where the entire transmitted binary word is uniformly decoded from one end only.

It is further advantageous for the selection of the macroblocks to be decoded forward and the selection of the macroblocks to be decoded backward is made in such a way that adjacent macroblocks are in each case decoded from different ends. This ensures that the respective macroblocks to be decoded differently are distributed as uniformly as possible over the entire image, so that an error occurring in one of the two groups of macroblocks cannot be detected as easily in the image.

It is further advantageous if the macroblocks to be decoded in the same manner are inserted into the stream of image data in a specific sequence, so that in each case those macroblocks which are positioned in the center of the image can be decoded first, and those macroblocks which are positioned in the edge regions of the image can be decoded last. As a result the particularly important image sections in the center of the image are always decoded first. If a transmission error then occurs, then always only the less important image information elements in the edge regions which are lost.

The spiral form according to the present invention is a particularly favorable sequence for transmission of the image data of the macroblocks to be decoded in the same manner.

It is further advantageous that the image data whose word length is defined a priori are equipped with a parity bit, so that error recognition upon transmission of said words becomes easier. Image data of the HEADER and ADMIN+DC-INTRA class are particularly important, namely the quantization words GQUANT and the DC-INTRA coefficients of the discrete cosine transformation.

It is further advantageous that in the transmission of coded image data, such as the MCBPC codes for chrominance information in the image (of the ADMIN+DC-INTRA class), and the MVD codes for the movement vectors (of the MW class), the shortest code used is a two-digit binary number, rather than a single-digit number as in the proposed H.263 standard. This also facilitates error recognition for these frequently used codes.

DETAILED DESCRIPTION OF THE INVENTION

The method according to the present invention is preferably used in the transmission of image data, a mobile radio channel being envisioned, in particular, as the transmission channel. The transmission rate with such channels is very limited; the maximum possible transmission rate is 64 kbit/sec. The image resolution at such transmission rates cannot be as high as with, for example, conventional television images.

Figure 1A:
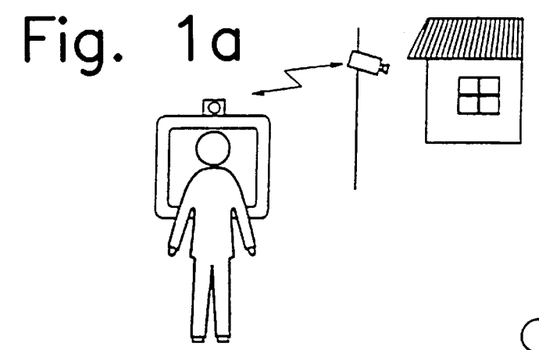
FIG. 1*a* shows a first exemplary application for a method according to the present invention, in which video images are transmitted in a wireless manner.
Figure 1B:
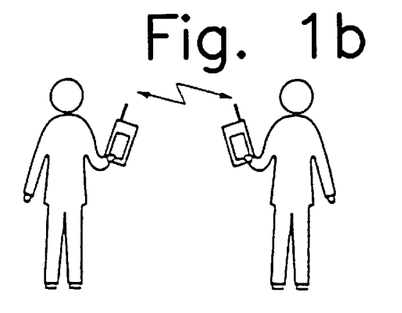
FIG. 1*b* shows a second exemplary application for the method according to the present invention.
Figure 1C:
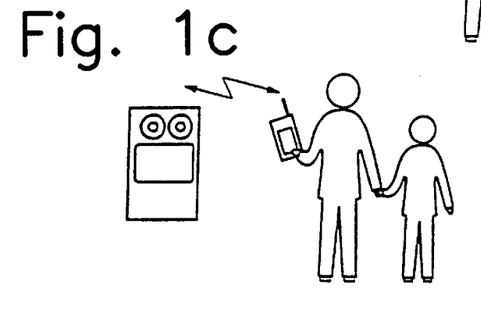
FIG. 1*c* shows a third exemplary application for the method according to the present invention.
Figure 1D:
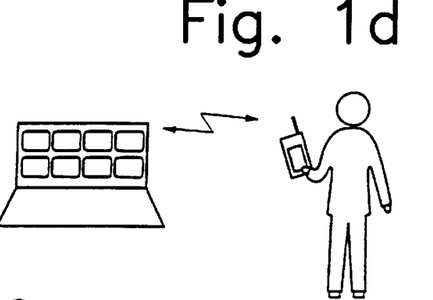
FIG. 1*d* shows a fourth exemplary application for the method according to the present invention.
Figure 1E:
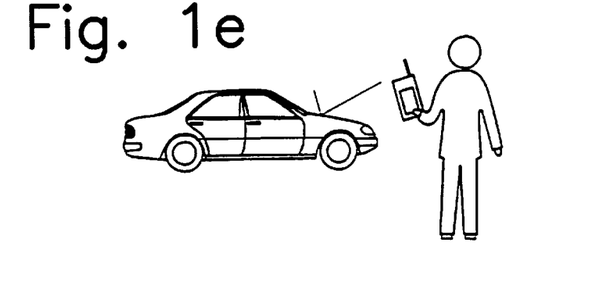
FIG. 1*e* shows a fifth exemplary application for the method according to the present invention.

FIGS. 1a–1e show several applications of image transmissions. According to the present invention FIG. 1a shows, for example, a video monitoring system that is used to protect at-risk buildings. FIG. 1b shows, as an application, the transmission of video data between two mobile videotelephones. FIG. 1c shows the application of identity verification using a mobile videotelephone. FIG. 1d shows the application of news transmission to a mobile videotelephone. FIG. 1e shows the use of a videotelephone in a motor vehicle repair shop for maintenance purposes; in this case repair instructions can be transmitted from a central station to a mobile receiving unit. The methods according to the present invention are then implemented in the respective subscriber units (videotelephone, video image receiver, video camera, etc.).

Figure 2:
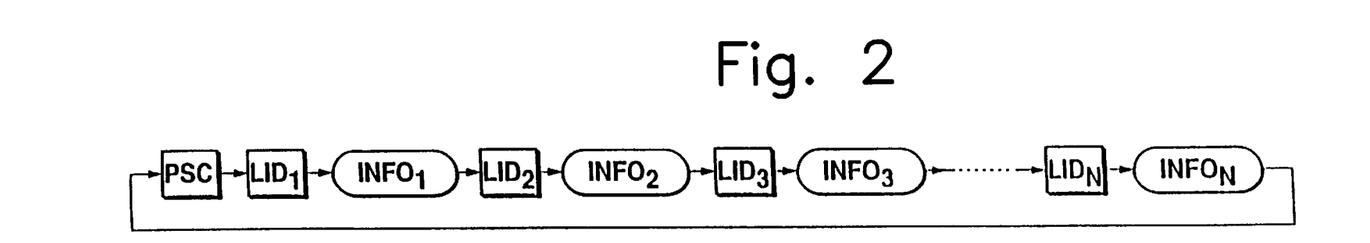
FIG. 2 shows a general class structure of a coded video image.

FIG. 2 shows a general class structure for a coded image. PSC designates the picture start code. $LID_1$ to $LID_N$ designate length information elements for the information elements $INFO_1$ to $INFO_N$ which follow. The rectangular fields in FIG. 2 possess a fixed and defined length, while the oval parts of FIG. 2 have a variable length.

Figure 3:
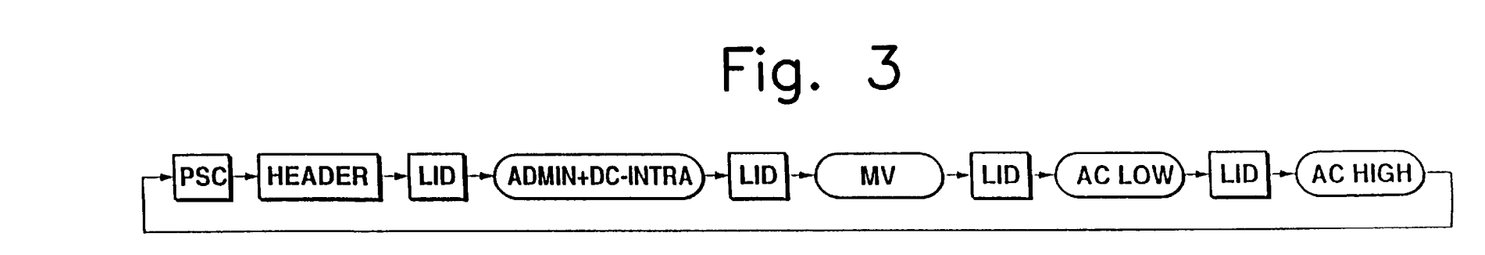
FIG. 3 shows a special class structure of the coded video image according to the present invention.

The class structure according to the present invention is shown in FIG. 3. PSC once again designates a start code word of an image. The information elements of the HEADER class are then transmitted, followed by a length information element LID for the subsequent ADMIN+DC-INTRA class, followed by the data of the ADMIN+DC-INTRA class. A length information element then follows for the subsequent MV class, and the data of the MV class are then transmitted. There then follows another length information element LID for the subsequent AC-LOW class, followed by the data for the AC-LOW class. Then follows a further length information element LID for the subsequent AC-HIGH, and finally the data of the AC-HIGH class are transmitted. Transmission of the image data of a video image is then complete, and a new video image can be transmitted.

Figure 4:
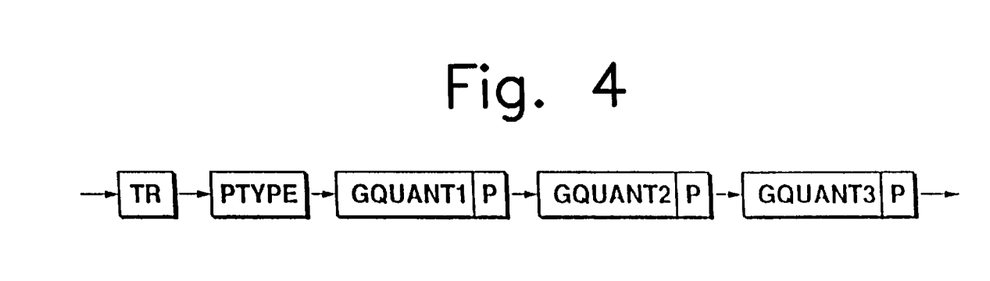
FIG. 4 shows a special structure of a "HEADER" class according to the present invention.

The individual classes and their structures during data transmission will be explained in more detail below. FIG. 4 shows the structure of the HEADER class. The image data transmitted in this class image data are those that either are valid for the entire image being transmitted, or contain information elements that are valid for specific macroblocks of the image. TR (Temporal Reference) designates a data field containing a code which provides information as to how many images, starting from the last image transmitted, may not have been transmitted.

PTYPE (Picture Type) designates an information element which has validity for the entire image. In the H.263 standard, the bit field has a length of 11 bits. The significance of the individual bits of this code may be obtained from the H.263 standard. GQUANT1 to GQUANT5 designate quantization information elements which indicate the quantization with which specific image portions were quantized. In FIG. 4, for example, five quantization values GQUANT1 to GQUANT5 are indicated. The transmission of multiple quantization values per image has the advantage that if, for example, a transmission error occurs in the transmission of quantization information element GQUANT1, not every portion of the image is automatically quantized incorrectly, since the quantization information elements GQUANT2 to GQUANT5 are still transmitted thereafter and, if no errors therein, correct quantization of the corresponding image data can take place.

Figure 5:
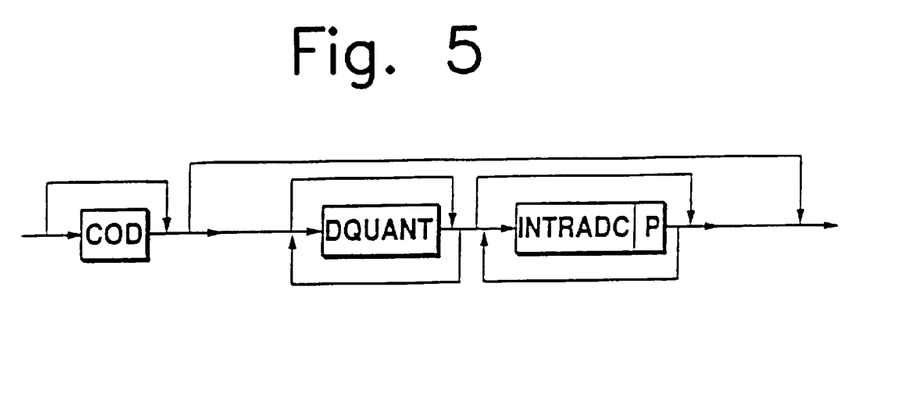
FIG. 5 shows a structure of an ADMIN+DC-INTRA class according to the present invention.

FIG. 5 shows the ADMIN+DC-INTRA class according to the present invention. In this class, the image information elements DQUANT and INTRADC are transmitted. The DQUANT information element indicates whether the corresponding macroblock was quantized with a quantization value different from the corresponding GQUANT value that was transmitted previously. The INTRADC values occur, alongside the AC coefficients, in the discrete cosine transformation for the corresponding macroblock. Both the DQUANT values and the INTRADC values have a fixed word length. According to the present invention, all the DQUANT and INTRADC values of all the macroblocks are transmitted consecutively. The variable-length data and the fixed-length data are not mixed, and an error occurring in a variable-length information element no longer necessarily leads to the loss of fixed-length information elements. COD (Coded Macroblock Indication) designates a bit field which indicates whether the next macroblock was in fact transmitted in coded fashion, or whether the data for that macroblock are instead to be transferred from the previous image.

Macroblocks are coded either INTER or INTRA. INTER coding indicates that a motion estimate is present for that macroblock, and motion vectors MV are transmitted. INTRA means that no motion estimate was made for the corresponding macroblock, and instead DQUANT and INTRADC values or AC coefficients are transmitted. These various information elements are described to the H.263 standard. The manner in which both discrete cosine transformation and quantization operate is also sufficiently known from the existing art. Reference is made, in this connection, to the article "Bildverarbeitung und Bildkompression für die digitale HDTV-Magnetbandaufzeichnung und für den digitalen TV/HDTV Rundfunk" (Image Processing and Image Compression for Digital TV/HDTV Broadcasting) in the book "Kommunikationstechnik, Trends und Entwicklungen", (Communications Technology—Trends and Developements) ed. Karl Dietrich Abel, pages 69 ff, VISTAS-Verlag, 1994.

Before the DQUANT and INTRADC values are transmitted, the administrative information elements MCBPC and CBPY are transmitted. MCBPC (Macroblock Type and Coded Block Pattern) designates a code indicating which of the blocks of a macroblock contains DQUANT values or INTRADC values. Reference is again made to the H.263 standard with regard to the meaning thereof. The CBPY datum (Coded Block Pattern for Chrominance) indicates whether specific DCT coefficients for the Y block of a macroblock will follow. In this connection as well, reference is made to the H.263 standard.

The code used in the transmission of the MCBPC code is not code "1" proposed in the H.263 standard, but rather code "10". The result is that in the event of a bit error in which a 0 is erroneously transmitted as a 1, a valid code cannot be recognized as easily. Two bit errors would then have to occur in succession in order to create a valid "10" code that would not be recognized as an error.

Figure 6:
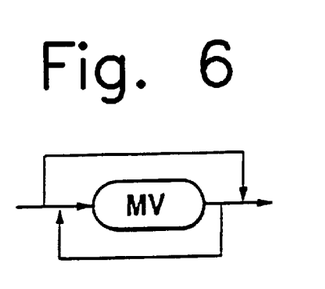
FIG. 6 shows a structure of a MV class according to the present invention.

FIG. 6 shows a MV (Motion Vector) class. In this class, according to the invention, all motion vectors of all macroblocks are transmitted in combination and in absolute fashion. No vector prediction as defined by the H.263 standard takes place. This counteracts the propagation of errors. In the transmission of motion vectors as well, the binary code "1" proposed in the H.263 standard is not used, but rather code "10".

Figure 7:
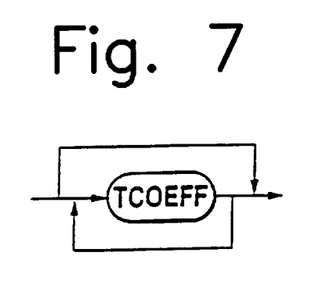
FIG. 7 shows a structure of an AC-LOW class according to the present invention.
Figure 8:
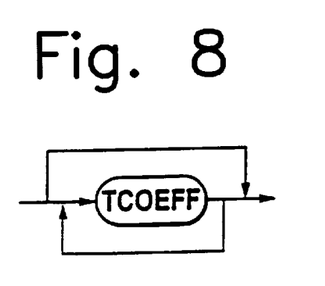
FIG. 8 shows a structure of an AC-HIGH class according to the present invention.

FIG. 7 shows the AC-LOW class, in which the AC coefficients of the discrete cosine transformation for the INTER coded macroblocks are transmitted consecutively. In this context, however, only the AC coefficients for the low frequencies in the image are transmitted. These coefficients, like the code words for the motion vectors (MV), have a variable length. An exemplary table of such code words is provided in the H.263 standard. FIG. 8, shows the AC-HIGH class, in which the corresponding AC coefficients of the discrete cosine transformation for the individual blocks of the corresponding macroblock are transmitted consecutively. These AC coefficients correspond to the higher frequencies of the transmitted image. As coefficients are, however, less important for image quality than the AC-LOW coefficients. Of course a further class could be added as well, containing, for example, the coefficients for the middle frequencies in the image.

Figure 9:
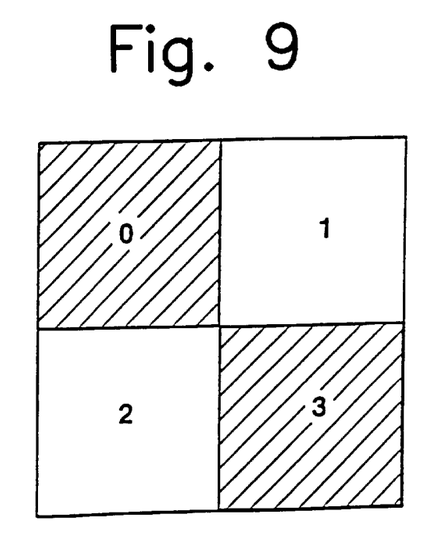
FIG. 9 shows a highly simplified video image consisting of only four macroblocks.
Figure 10:
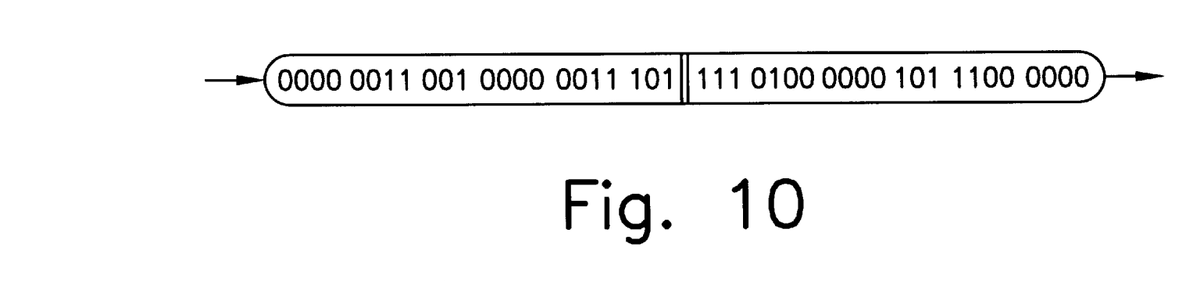
FIG. 10 shows an example of a bit stream of the MV class for the image illustrated in FIG. 9, to explain the principle of forward/backward decoding.

FIG. 9 shows a highly simplified video image with only four macroblocks, numbered 0 to 3. The cross-hatch macroblocks 0 and 3 are decoded forward in the receiver station. Macroblocks 1 and 2, on the other hand, are decoded backward. Reference is made to FIG. 10 for an explanation of forward and backward decoding. FIG. 10 shows the bit stream that occurs during transmission of the MV class for the macroblocks of the image in FIG. 9. For macroblock 0, the vector with the coordinates (−8; 24) is transmitted as the motion vector. This corresponds, according to Table 8 in the H.263 standard, to the binary code 0000 0011 001. For macroblock 1, the motion vector with coordinates (−7; 25) is transmitted. This motion vector corresponds to the binary code 0000 0011 101. For macroblock 2, the motion vector with the coordinates (−8; 23, 5) is transmitted. This vector corresponds, according to the table corresponding to the H.263 standard, to the code 0000 0011 101. For the macroblock numbered 3, the motion vector (−7; 25) is transmitted. This corresponds to the code 0000 0011 101. The codes for macroblock 0 and macroblock 3 are transmitted in forward-decoded fashion. This yields the bit stream in the left-hand portion of FIG. 10, in which first the code word for macroblock 0, and directly thereafter the code word for macroblock 3 are transmitted. The code words for macroblocks 1 and 2 are transmitted in backward-decoded fashion. This means that the code words for the corresponding macroblocks are transmitted so as to be read from right to left; first the code word for macroblock 2 is transmitted, and then the code word for macroblock 1. The result is the bit stream as shown in the right-hand portion of FIG. 10.

Figure 11:
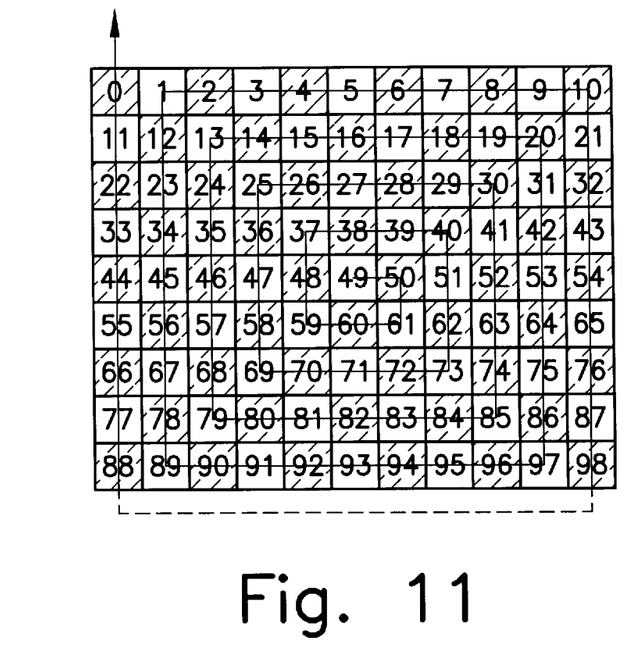
FIG. 11 shows an image consisting of 99 macroblocks with a division of macroblocks into macroblocks to be decoded forward/backward, and with a spiral pattern provided.

FIG. 11 shows the division of a video image into 99 macroblocks. The macroblocks are sequentially numbered from 0 to 98. This also corresponds to the division of a video image into macroblocks in accordance with the H.263 standard. According to the present invention, one half of the macroblocks of the image are decoded forward, and the other half of the macroblocks are decoded backward. The macroblocks shown as shaded are decoded forward, and the macroblocks depicted as unshaded are decoded backward. Of course a different division of the macroblocks into macroblocks to be decoded forward and backward is also possible in the context of the present invention. In the exemplifying embodiment of FIG. 11, the division is selected so that adjacent macroblocks are always to be decoded differently. The result is a checkerboard pattern. In addition, a spiral is drawn in on FIG. 11. This spiral defines the sequence in which the image information elements of the individual macroblocks are to be consecutively transmitted. This procedure will now be explained with reference to FIG. 12, which shows the transmission of image information for the AC-LOW or AC-HIGH class. When considered on the macroblock level, all of the AC coefficients for the macroblocks of the image are transmitted consecutively. An indication is given, in the image, of the sequence in which the data for the macroblocks are transmitted. In the first part of FIG. 12, the macroblocks to be decoded forward are transmitted consecutively. The spiral of FIG. 11 defines which of the macroblocks to be decoded forward are transmitted first. The macroblock numbered 50 is transmitted first. This is then followed by the macroblock numbered 60, then the macroblock numbered 48, etc. The macroblocks numbered 44, 22, and 0 are transmitted last. This sequence is selected because in a video image, the image portions in the center of the video image are generally the most significant. In the case of a videotelephone, for example, if the speaker appears in the image, the head and shoulders of the speaker appear predominantly in the center of the image. If a transmission error then occurs in the course of the transmission and is also recognized by the decoder in the receiver station, the subsequent information elements for the following macroblocks must then be marked as erroneous, since the code words being transmitted have different lengths and therefore can no longer be analyzed correctly after an error has occurred. The fact that the sequence is defined, however, ensures that the most important image portions are decoded first, and are not declared to be erroneous after an error has occurred. The second part of FIG. 12 indicates the sequence of those macroblocks that are to be decoded backward. In temporal terms, the macroblocks from the edge regions are transmitted first, and then lastly the most important macroblocks in the center. Once all the data from all the macroblocks have been received, decoding of these macroblocks to be decoded backward can then take place from right to left. This guarantees that the most important macroblocks 49, 61, 59, etc. are decoded first, while the less important macroblocks 55, 33, 11 are decoded at the end.

Figure 12:
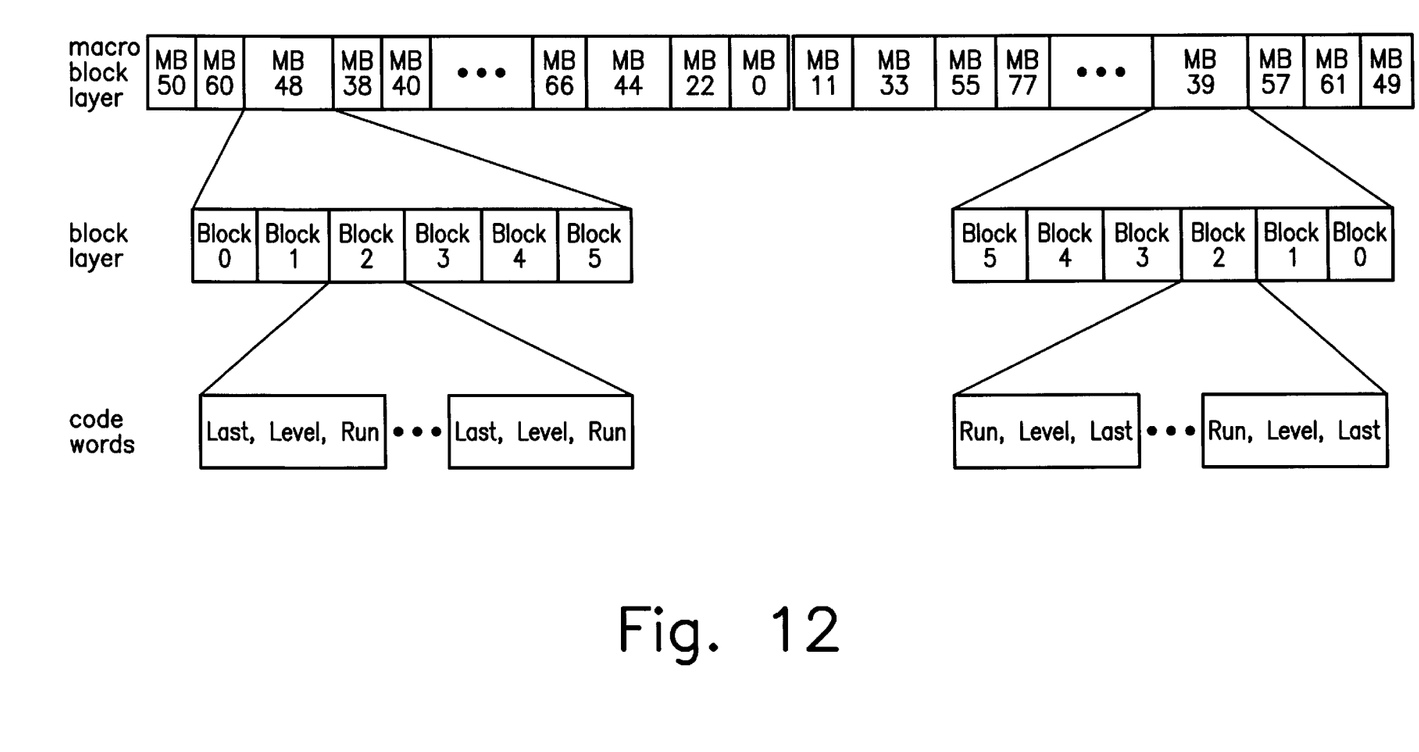
FIG. 12 shows an example of a bit stream of the AC-LOW class for the image illustrated in FIG. 11.

Block 48 to be decoded forward is shown in FIG. 12 subdivided further into the blocks numbered 0 to 5, since the individual macroblocks as defined by standard H.263 are divided into six further blocks. Blocks 0 to 3 contain the luminance information elements, and blocks 4 and 5 the chrominance information elements. The corresponding code words for the AC coefficients are transmitted in each of the block 0 to 5.

In the second part of FIG. 12, the sequence of code word transmission for macroblock 37 is to be read from right to left, so that once again the code words for block 0 can be decoded first, and the code words for block 5 last. The code words are correspondingly mirror-imaged, as indicated in FIG. 10.

Figure 13:
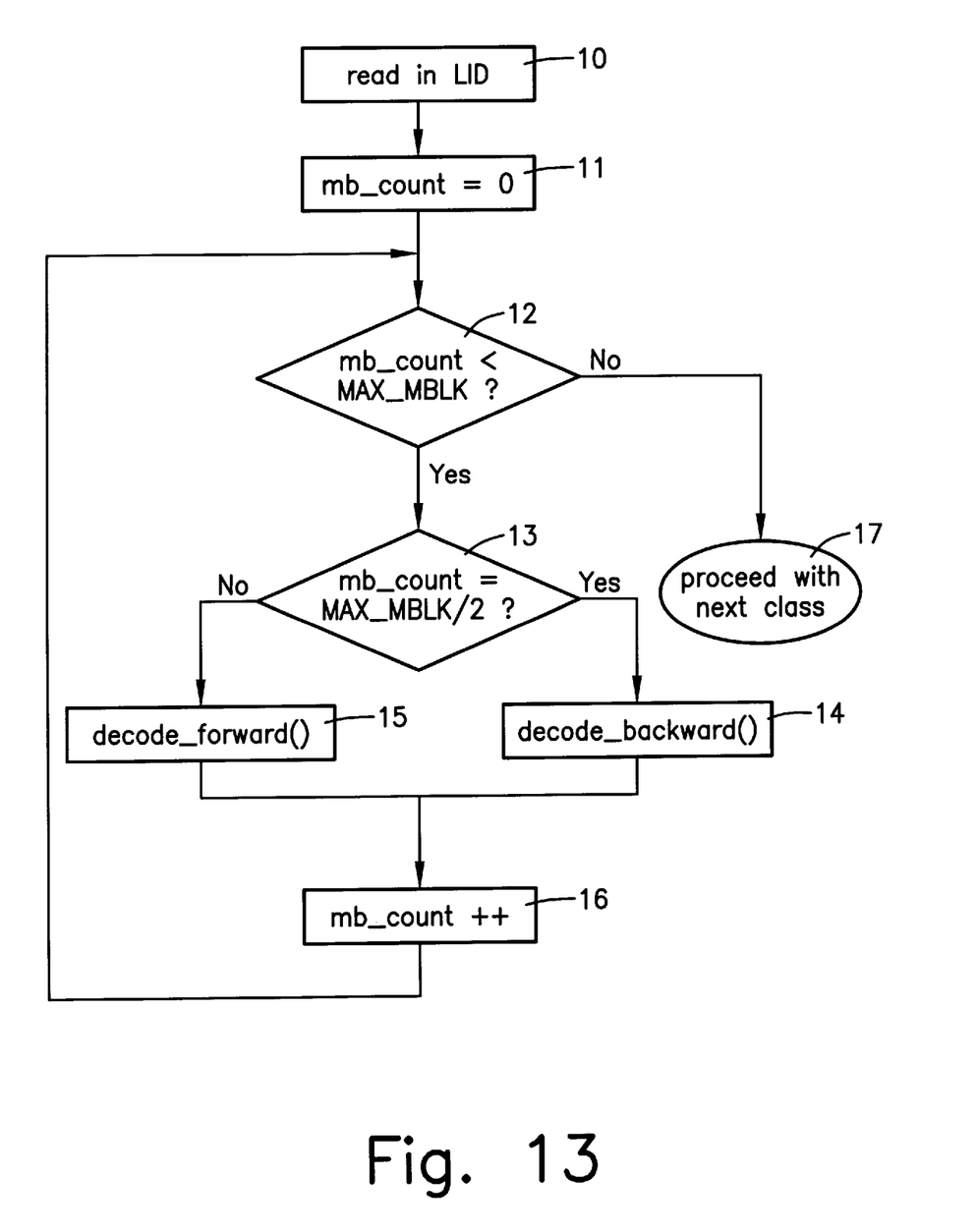
FIG. 13 shows an exemplary flow chart for a program for decoding a bit stream of one class, where no bit errors occur.

FIG. 13 shows a general flow chart for a program which controls decoding of the transmitted image information within a class. The reference number 10 designates a program step in which the length information element LID is read in prior to transmission of a class. In program step 11, a macroblock counter is then set to a value of 0. In query, 12, a check is made as to whether the macroblock counter is lower then the maximum number of macroblocks in an image. If so, then in query 13 a check is made as to whether the macroblock counter has already reached a value of half the maximum number of macroblocks. If so, the subsequent macroblocks are decoded backward in step 14. If not, the subsequent macroblocks are still decoded forward. This then takes place in program step 15. The macroblock counter is then incremented; this takes place in program step 16. The program then returns to repeat query 12. When it is finally recognized in query 12 that the macroblock counter has reached a value equal to the maximum number of macroblocks, the program proceeds to decode the image data of the next class. This then takes place in program step 17. The flow chart set forth in FIG. 13 is provided for the case in which no transmission errors occur during decoding. The program is executed by a suitable microprocessor.

Figure 14A:
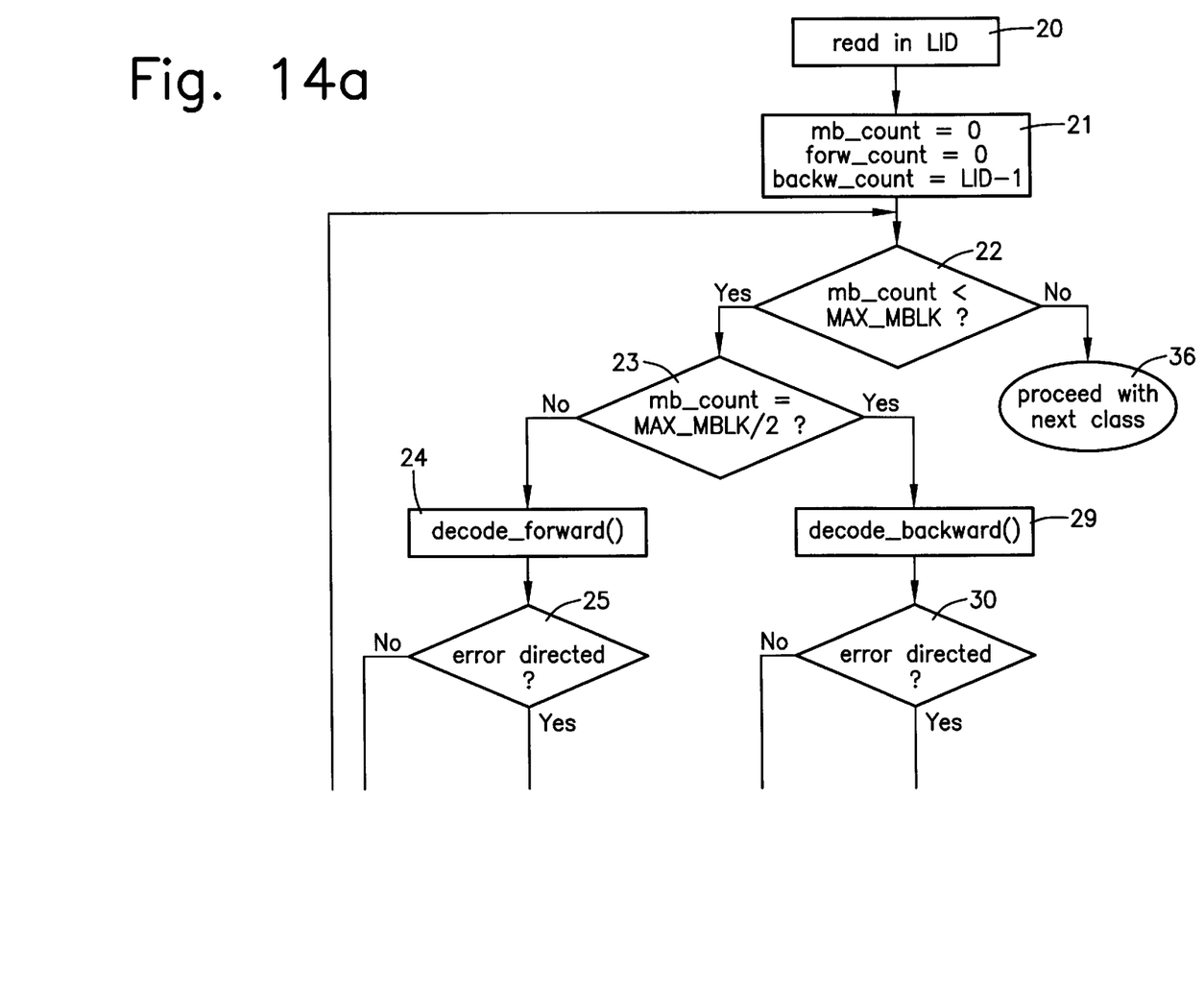
FIG. 14 shows another exemplary flow chart for a program for decoding a bit stream of the MV class and accounting for bit errors.
Figure 14B:
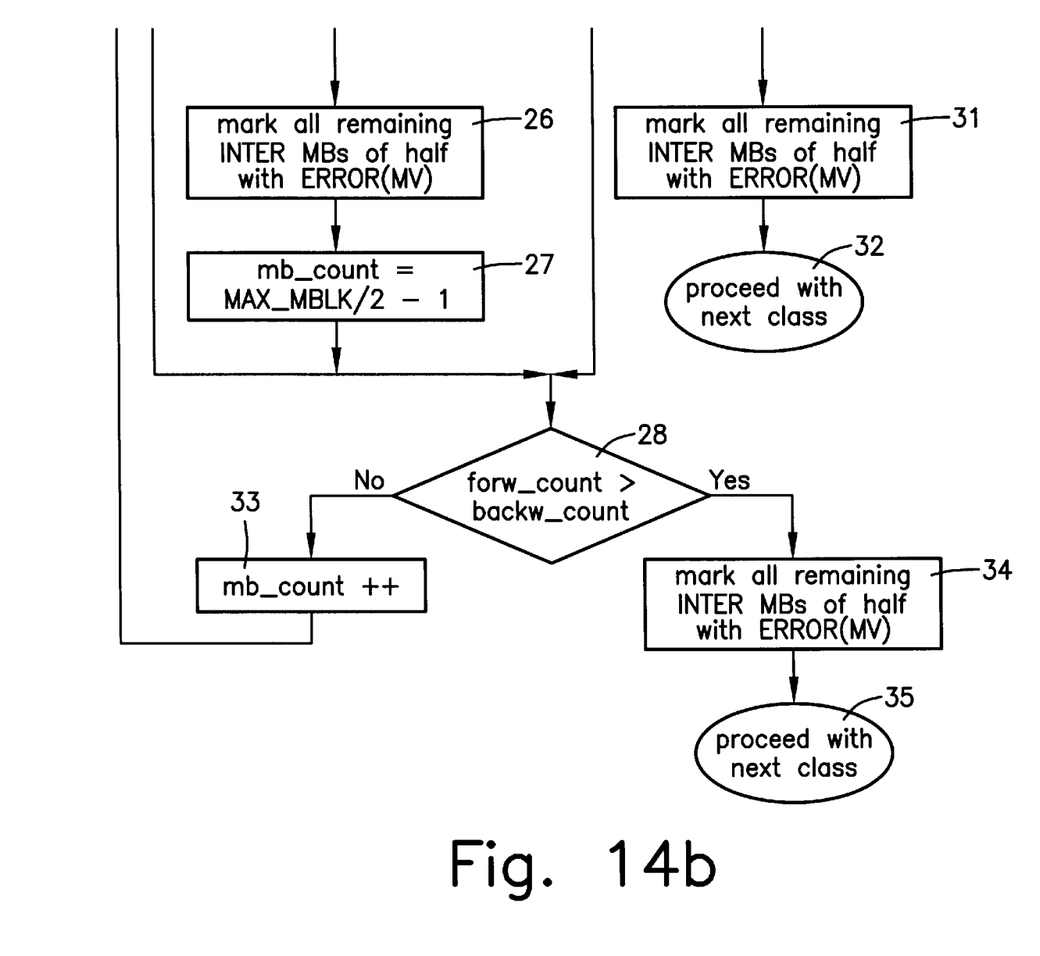

FIG. 14 depicts a further flow chart which also contains error handling actions if a transmission error has been recognized. The reference number 20 once again designates a program step in which length information elements for the class being transmitted are read in and analyzed. In program step 21, a macroblock counter mb_count is set to a value of 0. In addition, a forward counter forw_count is set to a value of 0 and a backward counter backw_count is set to the value LID read out in the LID field, minus 1. In query 22, a query is then once again made as to whether the macroblock counter has already reached the maximum number of macroblocks. At this point in time this will not yet be the case. In the subsequent query 23 a query is then made as to whether the macroblock counter already corresponds to half the value of the maximum number of macroblocks. If this is not yet the case, then the next macroblock is decoded forward in program step 24. Then in query 25 a query is made as to whether an error has been recognized. If so, in the next program step 26 all the macroblocks that are yet to be decoded forward are marked as erroneous. This is possible because the macroblock counter always indicates how many macroblocks have already been decoded, and the total number of macroblocks to be decoded forward is evident a priori from the length information element. In program step 27, the macroblock counter is then set to half the value of the maximum number of macroblocks minus 1. If no errors were recognized in query 25, program steps 26 and 27 are skipped.

If it was determined in query 23 that the macroblock counter had already reached a value of half the maximum number of macroblocks, the subsequent macroblocks are then decoded backward. This takes place in program step 29. In query 30, a query is then again made as to whether an error has been recognized. If so, then in program step 31 all as-yet-undecoded macroblocks of the group with the macroblocks to be decoded backward are marked as erroneous. Then in program step 32, decoding of the data of the next class begins. If no errors were recognized in query 30, query 28 then follows. This query determines whether the forward counter has in the meantime reached a count which is greater than the count of the backward counter. This requires, of course, that in program step 24, the forward counter be incremented in each case after decoding a macroblock, and that backward counter 29 be decremented after decoding of a macroblock that is to be decoded backward. If the condition in query 28 is met, in the subsequent program step 31 the macroblock counter is incremented and the program can then continue with query 22. If it is found instead in query 28 that the forward counter has a lower count than the backward counter, then an unrecognized error must be present in any case, and all the remaining macroblocks that are to be decoded backward are marked as erroneous. Decoding of the data of the next class then proceeds in program step 35. Even if it is recognized in query 22 that the macroblock counter has a higher count than the maximum possible number of macroblocks, decoding of the data of the next class proceeds. This takes place in program step 36.

The general decoding principle is thus characterized by the following three phases:

1. The class information according to the indication in the LID field is read in and analyzed;

2. Forward decoding until half the macroblocks have been decoded;

3. Backward decoding of the second half.

The exceptions are the first class (HEADER), whose length can be constant so that no length information element LID needs to be transmitted; and the last class. The length information element of the last class can also be omitted, since decoding always proceeds until the next picture start code.

Bit errors on the transmission channel can result in a wide variety of symbol errors. One common to all classes is, for example, a shift in the boundary between forward and backward decoding due to an error, resulting in decoding beyond that boundary or in too little decoding of one half. An error of this kind can be recognized by using the previously described forward/backward counters. Initially, the forward counter is set to 0 and the backward counter to the maximum bit quantity in that class, minus one (LID−1). If the two counters overlap with one another after both halves have been decoded, an error is present and further decoding is terminated. In addition, a specific number of the most recently decoded symbols of both halves can be retroactively ignored.

If an error is recognized within the forward half, all the macroblocks or symbols of the macroblocks from the current position to the end of the half are marked as erroneous; a specific number of previously decoded macroblocks/symbols can also be retroactively discarded. A switchover then occurs to decoding of the backward half. If an error occurs in the backward half, decoding of the class is terminated after marking of the remaining macroblocks/symbols.

All macroblocks marked as erroneous are replaced in the receiver station by the corresponding macroblocks of the previous image. If only portions of the content of a macroblock have been recognized as erroneous, the following procedure is possible depending on the class. Reference is made in this connection to the table below.

| Class | Errors in symbols | Treatment of errors |
| --- | --- | --- |
| HEADER | PQUANT+P | Use last quantizer of preceeding image |
|  | GQUANT+P | Use differential quantizer DQUANT |
| ADMIN+ | MCBPC | set all succeeding macrobocks of the half |
| DC− |  | to "Not Coded"; if forwards, switch |
| INTRA |  | to backwards |

-continued

| Class | Errors in symbols | Treatment of errors |
|---|---|---|
| | DC–INTRA+P | set current macroblock, after image has been completely decoded, to "Not Coded" (as an option, only the block affected can be set to "Not Coded") |
| | CBPY | set all succeeding macroblocks of the half to "Not Coded"; if forwards, switch to backwards |
| MV | MV | set all succeeding INTER-macroblocks of the half, after image has been completely decoded, to "Not Coded"; if forwards, switch to backwards |
| AC LOW | TCOEFF | set the AC coefficients of all succeeding macroblocks of the half, after image has been completely decoded, to zero; if forwards, switch to backwards |
| AC HIGH | TCOEFF | if forwards, switch to backwards |

The method according to the present invention is not limited to the embodiment described here. For example, it is not absolutely necessary for half of the macroblocks to be decoded forward and the other half of the macroblocks to be decoded backward. It is also possible to select, for example, a division of two-thirds decoded forward and one-third decoded backward, or the like. Instead of five global quantization values for an image being transmitted, it is also possible to use a different number, for example three or even more than five quantization values.

What is claimed is:

1. A method for generating an image data stream transmitted via a data channel, comprising the steps of:
dividing image data into macroblocks;
dividing image information elements of the image data into classes of similar information elements;
coding the image data of at least a portion of the classes; and
transmitting a class of the coded image data into the image data stream, the transmitted class of coded image data having a beginning and an end, wherein a first portion of the transmitted class of coded image data is chronologically decoded in a receiver station starting from the beginning of the transmitted data, and wherein a second portion of the transmitted class of coded image data is reverse-chronologically decoded in the receiver station starting from the end of the transmitted data;
wherein the step of transmitting further comprises the steps of:
identifying corresponding macroblocks for the coded image data to be transmitted; and
providing a predetermined sequence for transmitting the coded image data organized by macroblocks,
wherein the macroblocks include center macroblocks positioned substantially in a center of an image, the center macroblocks being decoded first, and wherein the macroblocks include edge macroblocks positioned in edge regions of the image, the edge macroblocks being decoded last.

2. The method according to claim 1, wherein the data channel includes a mobile radio channel.

3. The method according to claim 1, wherein the image information elements include a global quantization information element, the global quantization information element being provided into the image data stream at least twice for different regions of the image.

4. The method according to claim 1, wherein the first and second portions of the transmitted class of coded image data are selected to decode adjacent macroblocks.

5. The method according to claim 1, wherein the step of providing a predetermined sequence further comprises the step of:
determining the predetermined sequence using a spiral pattern starting from the center of the image and continuing to all regions of the image, the edge regions being reached last.

6. The method according to claim 1, further comprising the step of:
providing one parity bit for a data word of the image data when fixed-word-length image data that are combined into a separate class are transmitted, the one parity bit being provided for recognizing errors.

7. The method according to claim 1, wherein the step of coding the image data includes utilizing a two-digit binary number as a shortest code.

8. The method according to claim 1, wherein the image data includes variable-word-length image data having at least one of MCBPC codes and MVD codes.

9. The method according to claim 1, wherein the step of providing a predetermined sequence further comprises decoding sequenced macroblocks from a same end in the predetermined sequence.

* * * * *

UNITED STATES PATENT AND TRADEMARK OFFICE
CERTIFICATE OF CORRECTION

PATENT NO. : 6,198,849 B1
DATED : March 6, 2001
INVENTOR(S) : Fischer, Ralf and Nitsche, Gunnar It is certified that error appears in the above-identified patent and that said Letters Patent is hereby corrected as shown below:

Column 1,
Lines 6-7, delete "The method according to the invention proceeds from a method according to the species defined in the main claim."

Column 2,
Line 13, delete "which"

Column 3,
Line 25, change "transmissions. According to the present invention FIG. 1a" to
-- transmissions according to the present invention. FIG. 1a --

Column 4,
Line 55, change "Developements" to -- Developments --

Column 5,
Line 23, change "FIG. 8," to -- FIG. 8 --
Line 28, change "As" to -- AC --

Column 7,
Line 6, change "then" to -- than --

Signed and Sealed this

Second Day of April, 2002

Attest:

JAMES E. ROGAN
Attesting Officer  Director of the United States Patent and Trademark Office